Aug. 8, 1950 J. D. CRABBE ET AL 2,518,125
APPARATUS FOR THE VULCANIZATION OF
RUBBER ARTICLES IN TRANSITU
Filed June 1, 1949 2 Sheets-Sheet 2

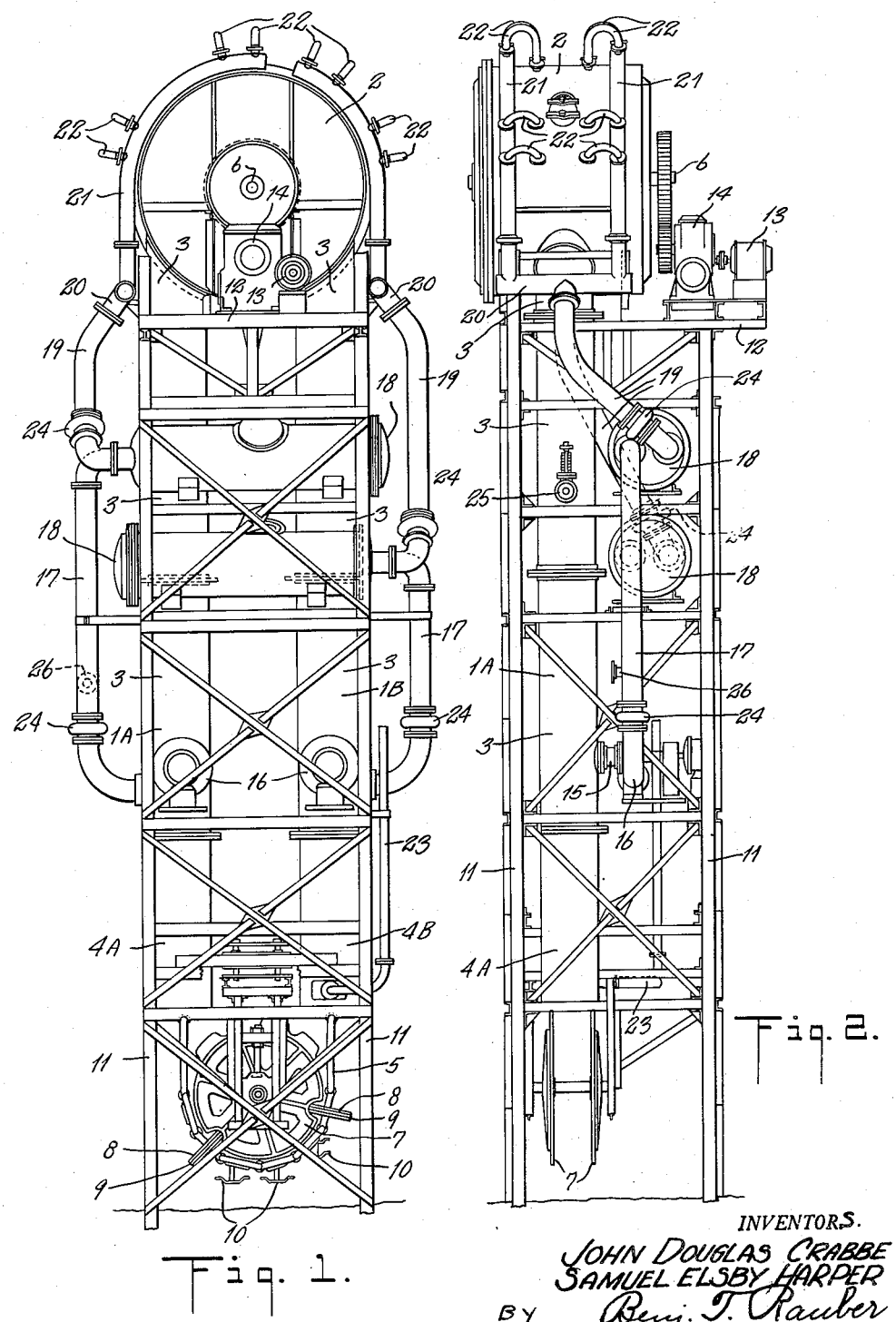

INVENTORS
JOHN DOUGLAS CRABBE
SAMUEL ELSBY HARPER
BY
Benj. T. Rauber
ATTORNEY

Patented Aug. 8, 1950

2,518,125

UNITED STATES PATENT OFFICE 2,518,125

APPARATUS FOR THE VULCANIZATION OF RUBBER ARTICLES IN TRANSITU

John Douglas Crabbe, Liverpool, and Samuel Elsby Harper, Heswall Hills, England, assignors to Dunlop Tire and Rubber Corporation, Buffalo, N. Y., a corporation of New York Application June 1, 1949, Serial No. 96,504
In Great Britain June 1, 1948

7 Claims. (Cl. 18—6)

The present invention relates to apparatus for the vulcanisation of rubber articles, for example footwear.

It is known to vulcanize articles in an autoclave containing heated compressed air, the articles being placed in the autoclave before it is heated and removed after the heating has been discontinued. With this type of apparatus large amounts of heat are lost after each batch of articles has been vulcanised, and time is taken to reach the correct vulcanising temperature for the next batch of articles.

The object of the present invention is to provide apparatus for vulcanising rubber articles in transitu whereby little heat is lost and the apparatus can be kept constantly at the vulcanisation temperature.

According to the present invention, apparatus for the vulcanisation of rubber articles in transitu comprises a pair of upright tubular members each having a cylindrical passage at the lower end communicating with the atmosphere, the diameter of the said passage being smaller than that of the tubular members, a closed chamber connecting the upper ends of the said members, an endless conveyor passing through the said members and chamber, a plurality of circular transverse members carried by the said conveyor during their travel therethrough, means affixed to said conveyor for transporting the said rubber articles, means for maintaining a vulcanising temperature within the said tubular members and chamber and means for operating the said conveyor.

One embodiment of the invention will now be described with reference to the accompanying drawings, in which like reference numerals are used to denote corresponding parts in the two views.

Figure 1 is a front elevation of the embodiment of the invention, and

Figure 2 is a side elevation of the embodiment with certain parts omitted.

Figure 3:
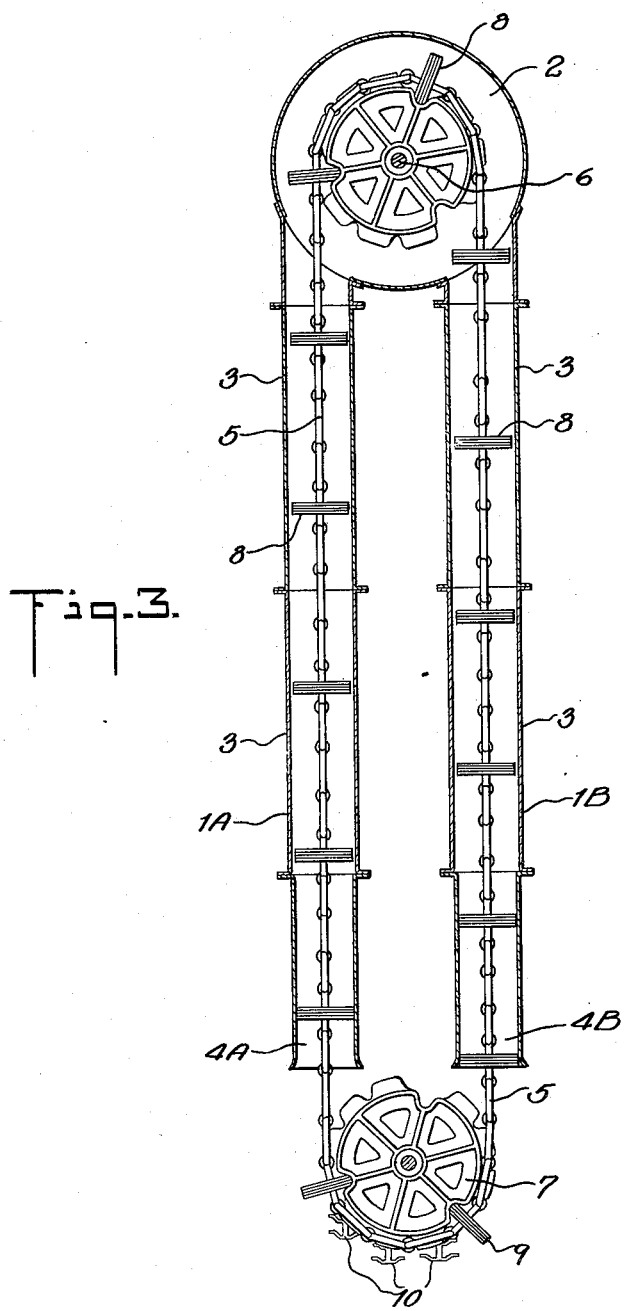
Figure 3 is a vertical sectional view of the apparatus.

Referring to the drawings, a pair of vertical tubular members IA and IB are connected at their upper ends by a cylindrical chamber 2. Each of the members IA and IB comprises a number of lengths 3 of 24" diameter piping joined end to end. Inlet and outlet passages 4A and 4B respectively are connected to the lower ends of the members IA and IB. Each of the passages 4A and 4B consists of a single length of 22" diameter piping having its lower ends slightly flared.

A conveyor 5 (not shown in Figure 2 for the sake of clarity), is composed of two endless chains of 16" pitch and passes through the passages 4A and 4B, the members IA and IB and the chamber 2 wherein it engages with a pair of driving sprockets (not shown) mounted on a rotatable shaft 6 coaxial with the chamber. A further pair of sprockets 7 are freely mounted some distance below the inlet and outlet passages to control the lower portion of the conveyor.

Attached to the chains of the conveyor at intervals are pistons 8, each of which is a sliding fit in the passages 4A and 4B. The distance between adjacent pistons is less than the length of either of the passages 4A and 4B so that there is always at least one piston in each of these passages. Each of the pistons incorporates a piston-ring 9 to ensure satisfactory sealing of the passages 4A and 4B during travel therethrough. Slings 10, to carry footwear or other articles to be vulcanised, are attached to the conveyor between the pistons.

The apparatus is supported by an open framework comprising four H-section stanchions 11 suitably braced. Near the top of the framework a platform 12 is attached to two adjacent stanchions to carry an electric motor 13 and a reduction gear 14 through which the shaft 6 and consequently the conveyor 5 are driven.

Pipes 15 lead from points near the lower ends of the tubular members IA and IB and are connected to the suction sides of motor-driven pumps 16. Each of the delivery pipes 17 from the pumps is connected to one of a pair of air preheaters 18, the exits of which are connected to the cylindrical chamber 2 through pipe systems comprising a main pipe 19, a T-piece 20, branch pipes 21 and distribution pipes 22. Electric heating elements (not shown) are attached to the interior of the casing of the chamber 2 adjacent the inlet apertures of the pipes 22.

A pressure vent pipe 23 is connected to the outlet passage 4B near the lower end thereof.

Expansion joints 24 are incorporated in the external air-pipe system at convenient points, and a pressure relief valve 25 is joined into the tubular member IA.

A "make-up" air supply inlet 26 is provided in the delivery pipe 17 of the pump 16 whose suction side is connected to the tubular member IA.

In operation, heated compressed air is admitted to the cylindrical chamber 2 whence it is forced down the vertical tubular members IA and IB. The compressed air is then extracted from the tubular members IA and IB by the suction pumps 16 and passed through the preheaters 18, the main pipes 19, the T-piece 20, the branch pipes 21 and the distribution pipes 22 into the chamber 2, passing as it does so over the heating elements attached to the interior of the casing of the chamber 2.

When the apparatus has attained the required temperature for vulcanisation, unvulcanised articles are attached to the slings 10 and the conveyor set in motion. As fresh slings become available more articles are attached to the conveyor. As the pistons are so spaced apart that one or more are in each of the passages 4A and 4B at any one time, the compressed air cannot escape freely from the lower ends of these passages.

The articles are carried by the conveyor through the inlet passage 4A, the tubular member 1A, the cylindrical chamber 2, down through the tubular member 1B and out of the passage 4B. Pressure is reduced as each compartment bounded by adjacent pistons 8 passes the vent pipe 23.

As the vulcanised articles emerge from the lower end of the outlet passage 4B they are removed from the slings 10 and that part of the conveyor rotates to be reloaded with unvulcanised articles before re-entry into the inlet passage 4A.

Thus the air lost is restricted to that air contained between adjacent pistons, which amount is lost each time a piston passes the pressure vent pipe.

Any insufficiency of total air within the apparatus is made up by passing air into the system through the inlet 26, and the pressure within the apparatus is limited to a predetermined maximum by adjustment of the relief valve 25.

Having described our invention, what we claim is:

1. Apparatus for vulcanizing rubber articles which comprises a pair of upright tubular members, each open at its lower end, a closed chamber connecting the upper ends of said tubular members to provide a continuous passage from the lower end of one member through said chamber to the lower end of the other chamber, each tubular member having a contracted zone at its lower open end, an endless conveyor extending through said passage and said open ends and circular sealing pistons mounted transversely on said conveyor at intervals less than the length of said zone and fitting and closing said contracted zones.

2. The apparatus of claim 1 having means for attaching articles to be vulcanized to said conveyor between said pistons.

3. The apparatus of claim 1 having means for circulating a heated gas through said passage.

4. The apparatus of claim 1 having pipes connected to said tubular members and said chamber, pumps for circulating a gas from said tubular members through said pipes to said chamber, and heaters to heat said gas in its passage to said chamber.

5. The apparatus of claim 1 having an inlet passage for gas under pressure to said passage and a pressure release valve connected to said passage.

6. The apparatus of claim 1 having a vent pipe in the zone at the delivery end of said conveyor.

7. The apparatus of claim 1 in which said endless conveyor is a chain conveyor and in which a supporting and driving sprocket for said conveyor is mounted in said chamber and a guiding sprocket is mounted below said tubular members.

JOHN DOUGLAS CRABBE.
SAMUEL ELSBY HARPER.

REFERENCES CITED

The following references are of record in the file of this patent:

UNITED STATES PATENTS

| Number | Name | Date |
|---|---|---|
| 277,018 | Eddy | May 8, 1883 |
| 1,411,706 | Bulley | Apr. 4, 1922 |
| 2,160,312 | Karthaus | May 30, 1939 |